United States Patent
Taniguchi et al.

(10) Patent No.: US 6,990,286 B1
(45) Date of Patent: Jan. 24, 2006

(54) REPRODUCED SIGNAL PROCESSOR

(75) Inventors: Masatoshi Taniguchi, Osaka (JP);
Takeshi Otsuka, Osaka (JP);
Nobukatsu Okuda, Osaka (JP);
Hirofuni Uchida, Osaka (JP); Shinya Tanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 991 days.

(21) Appl. No.: 09/786,524

(22) PCT Filed: Jul. 6, 2000

(86) PCT No.: PCT/JP00/04476

§ 371 (c)(1),
(2), (4) Date: Jun. 8, 2001

(87) PCT Pub. No.: WO01/05149

PCT Pub. Date: Jan. 18, 2001

(30) Foreign Application Priority Data

Jul. 7, 1999 (JP) ................................ 11-192764

(51) Int. Cl.
*H04N 5/91* (2006.01)
(52) U.S. Cl. ........................... 386/68; 386/95; 386/112
(58) Field of Classification Search ................. 386/46, 386/68, 112, 95, 81, 77
See application file for complete search history.

(56) References Cited

U.S. PATENT DOCUMENTS 5,179,451 A * 1/1993 Takeshita et al. ............. 386/77
5,838,249 A * 11/1998 Saito et al. ................ 340/3.55

FOREIGN PATENT DOCUMENTS

| DE | 4402870 | 8/1994 |
|---|---|---|
| EP | 0 763 935 A2 | 3/1997 |
| EP | 917145 | 5/1999 |
| EP | 0917145 A2 * | 5/1999 |
| JP | 02-048883 A | 2/1990 |
| JP | 06-105283 A | 4/1994 |
| JP | 06-141284 A | 5/1994 |
| JP | 06-350967 | 12/1994 |
| JP | 9-69261 | 3/1997 |
| JP | 9-139019 | 5/1997 |
| JP | 09-172610 | 6/1997 |
| JP | 10-098682 A | 4/1998 |
| JP | 11-146345 | 5/1999 |

* cited by examiner

*Primary Examiner*—Huy Nguyen
(74) *Attorney, Agent, or Firm*—RatnerPrestia

(57) ABSTRACT

A reproduced signal processor comprising sync block detecting means (100), data information generating means (106), first memory means (105), memory writing means (104), memory reading means (109) for parallel reading data of n frames (n is an integer of 2 or more satisfying $\alpha<n$) stored in the first memory means (105), and transferring means (112, 1504) for transferring n pieces of transfer data after restructuring n pieces of frame data read out by the memory reading means (109) according to the data information or not restructuring them.

11 Claims, 16 Drawing Sheets

REPRODUCED SIGNAL PROCESSOR

This Application is a U.S. National Phase Application of PCT International Application PCT/JP00/04476.

TECHNICAL FIELD

The present invention relates to a reproduced signal processing apparatus for processing data reproduced at an arbitrary speed from a recording medium in which data is recorded in sync block units together with identification information of sync blocks.

BACKGROUND ART

In a helical scanning VCR, a prior art about double speed reproduction and shuttle reproduction by so-called non-tracking method is disclosed, for example, in Japanese Laid-open Patent No. 9-139019.

This prior art discloses the following.

(1) In 2-speed or 4-speed reproduction, reproduced data of two frames or four frames are issued by decimating one frame.

(2) In up to 1-speed drive, data of one frame is transmitted, in 2-speed drive, two frames are transmitted, and in 4-speed drive, four frames are transmitted. Composition of data in transmission is arranged in the recording order, and quantity of data corresponding to the speed is transmitted.

In this prior art, however, the following problems are known.

(1) Since transmission data does not include all of reproduced data, a reproduced image of smooth motion cannot be obtained from transmission data at an arbitrary speed.

(2) It is hard to arrange the data in the recording order at an arbitrary reproduction speed. That is, it is hard to transmit data reproduced at an arbitrary reproduction speed.

SUMMARY OF THE INVENTION

To solve these problems, a reproduced signal processing apparatus of the invention comprises sync block detecting means for detecting identification information of reproduced data, data information generating means for generating data information composed of track information, field information and frame information from the identification information, first memory means for storing plural frames of reproduced data, memory writing means for writing reproduced data in the first memory means on the basis of the identification information, memory reading means for reading out parallel the data of n frames (n being an integer of 2 or more satisfying the relation of $\alpha \leq n$) accumulated in the first memory means, and transmitting means for transmitting n pieces of transmission data by restructuring or without restructuring n pieces of frame data being read out by the memory reading means on the basis of the data information.

A reproduced signal processing apparatus in other example of the invention comprises sync block detecting means for detecting identification information of reproduced data, data information generating means for generating data information composed of track information, field information and frame information from the identification information, first memory means for storing plural frames of reproduced data, memory writing means for writing reproduced data in the first memory means on the basis of the identification information, memory reading means for reading out parallel the data of n frames (n being an integer of 2 or more satisfying the relation of $\alpha \leq n$) accumulated in the first memory means, and reproduction output control means.

It further comprises (1) delay means for issuing data of n frames being read out by the memory reading means by delaying by one field and two fields each, and also issuing data of n-th frame by delaying by three fields, and reproduction output control means for selecting and issuing outputs of the delay means and memory reading means in field units on the basis of the data information. Or it also comprises (2) second memory means for accumulating data of n frames being read out by the memory reading means for the portion of three frames each, and reproduction output control means for selecting and issuing field data on the basis of the data information, from the data delayed by one frame and two frames by controlling the second memory means.

BRIEF DESCRIPTION OF THE DRAWINGS

FIG. 10 is an operation explanatory diagram of output control in embodiment 2.

FIG. 13 is an operation explanatory diagram of output control in embodiment 3.

BEST MODE FOR CARRYING OUT THE INVENTION

Figure 1:
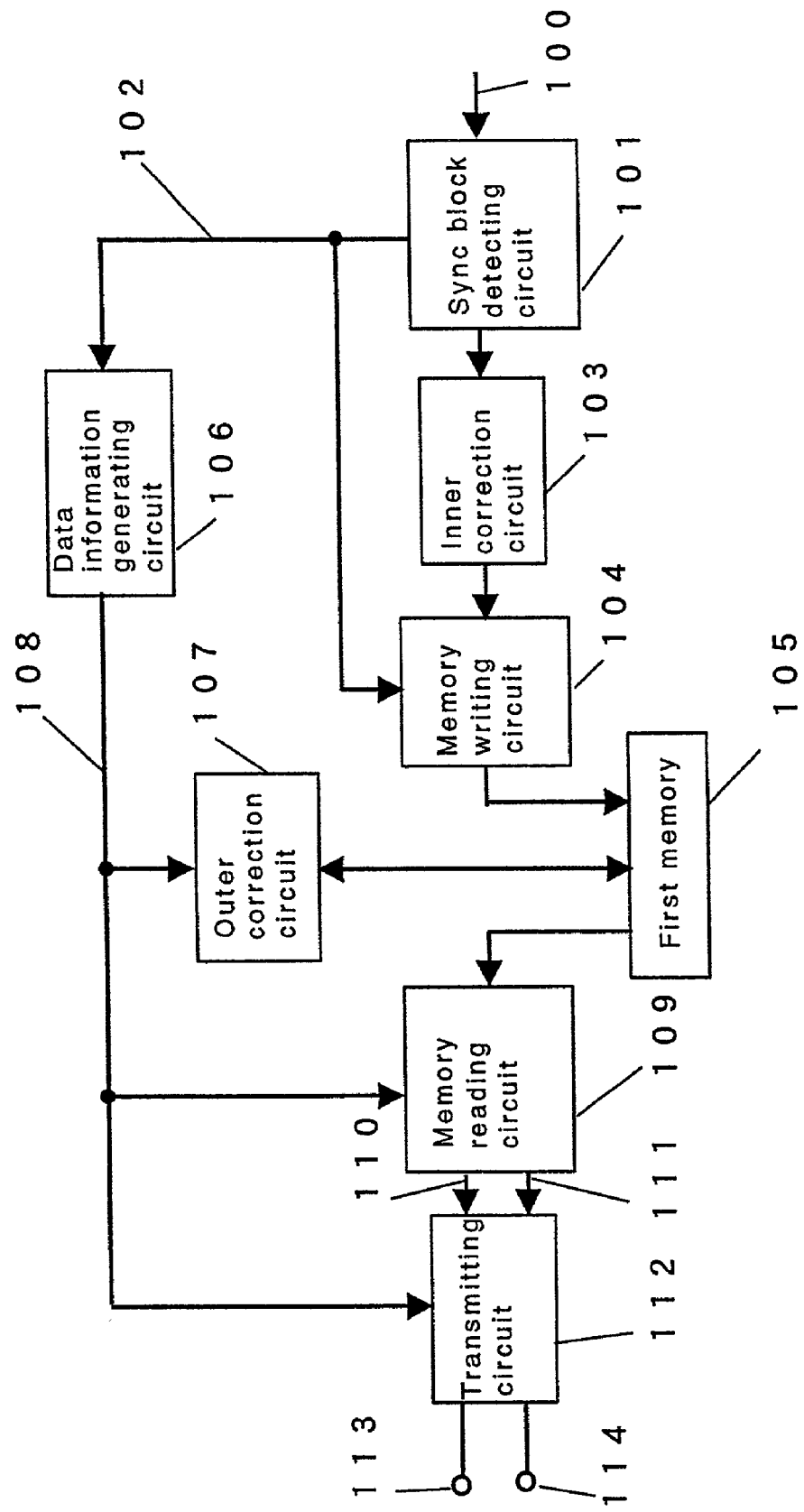
FIG. 1 is a block diagram showing a configuration of a reproduced signal processing apparatus in embodiment 1 of the invention.

Referring now to the drawings, preferred embodiments of the invention are described below.

Embodiment 1

FIG. 1 is a block diagram showing a configuration of a reproduced signal processing apparatus in embodiment 1 of the invention. This embodiment is designed to transmit data reproduced at an arbitrary α-times speed (an integer satisfying the relation of α≦n) in a range of standard reproducing speed ±2 times (n=2).

In FIG. 1, reproduced data 100 is data reproduced at arbitrary α-times speed within ±2 times speed by so-called non-tracking method. Or the reproduced data 100 may be once recorded in a disk device and reproduced from the disk device. The reproduced data 100 is provided with identification information of sync block in sync block units of specified length.

A sync block detecting circuit 101 detects a sync signal of reproduced data 100, and detects and issues identification information 102. The identification information 102 is composed of sync block number and track number. The track number is also a unit in encoding time of outer correction code.

After the sync signal is detected, the data is put into an inner correction circuit 103 to undergo inner error correction. A memory writing circuit 104 determines the data writing address by using the identification data 102, and accumulates the data corrected of inner error into a first memory 105.

A data information generating circuit 106 issues data information 108 showing the status of accumulation in the memory 105 from the identification information 102. The data information 108 is composed of track information, field information, and frame information.

<Generation of Track Information>

Generation of track information is determined on the basis of the track number. However, the reproduced data 100 is not always the tracked data, and different track numbers may be reproduced consecutively. Therefore, when the track number of the identification information 102 is used directly as the track information, it cannot be judged accurately which track number the data accumulated in the memory 105 has.

Accordingly, the track number detected finally in the time required to reproduce one track number in 1-speed reproduction (hereinafter called head switch time) is compared with the track information of one head switch time before.

In the case there are two kinds of track numbers to be reproduced continuously in non-tracking state, and in the case of forward direction reproduction (+reproduction), the track information is the value of subtracting the correction value 2 from the last track number detected in the head switch time.

The reason why the correction value is 2 is, in the case of reproduction of two kinds of track numbers in one head switch time, that the data having these track numbers is not completely accumulated yet, and that the data of the track having the number two places away from the present track number is completely accumulated.

Accordingly, the track information of one head switch time before, and the value subtracting correction value 2 from the last track number detected in the head switch time are compared, and the larger value is updated as new track information.

In the case of backward direction reproduction (−reproduction), the track information of one head switch time before, and the value adding correction value 2 to the last track number detected in the head switch time are compared, and the smaller value is updated as new track information.

Figure 2:
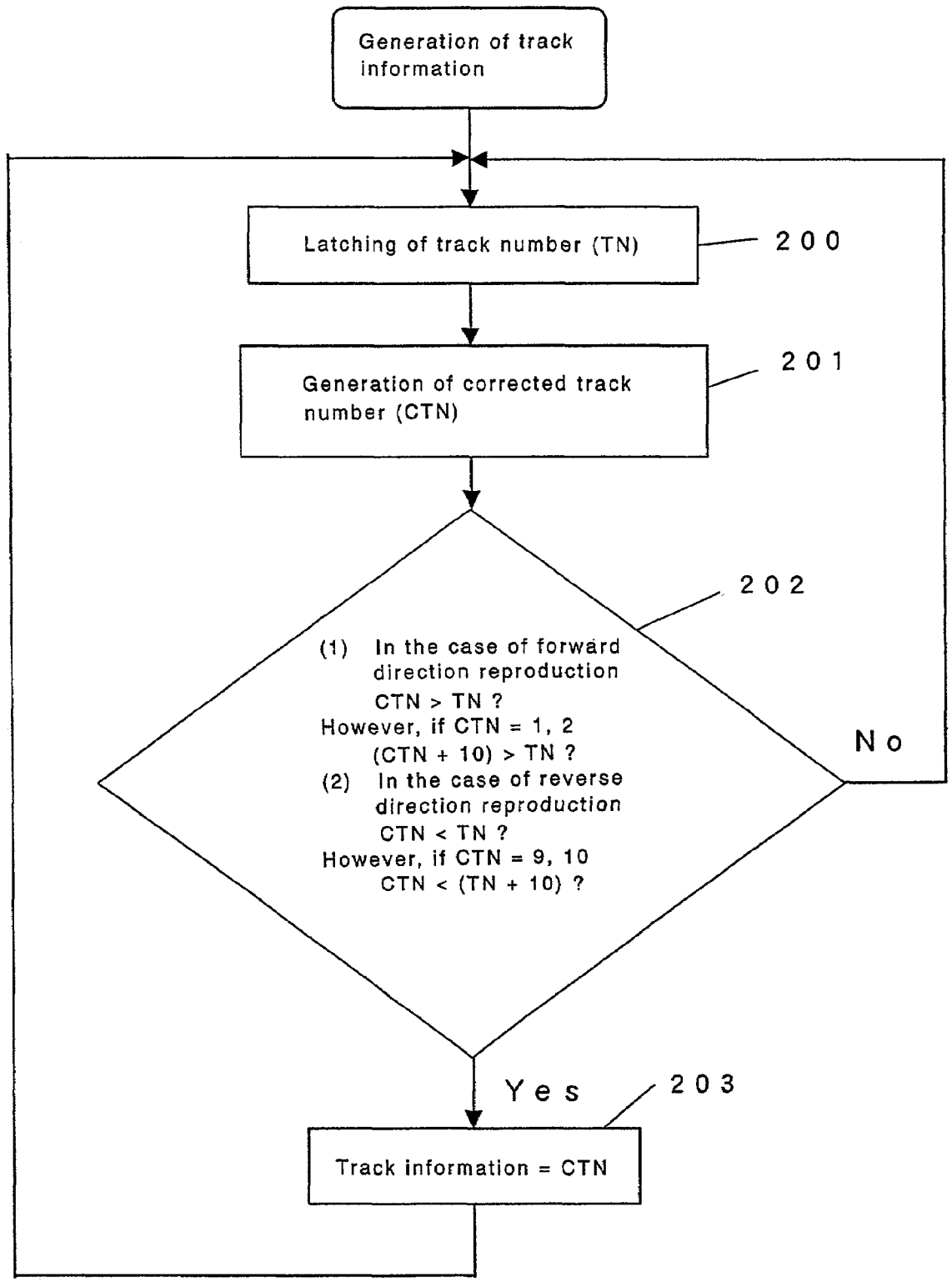
FIG. 2 is a flowchart showing a generation algorithm of track information in embodiment 1.

Referring now to FIG. 2, an algorithm of generating track information by the data information generating circuit 106 is explained.

At step 200, the identification information 102 detected by the sync block detecting circuit 101 is latched in the last place of head switch time. That is, a track number (TN) is latched.

At step 201, depending on the data reproducing direction, the latched track number is corrected as follows, and a corrected track number (CTN) is generated.

(1) In the Case of Positive Direction Reproduction

Corrected track number=track number−2 (correction value)

However, when track number is 1, correction track number is 9, and when track number is 2, correction track number is 10.

(2) In the Case of Negative Direction Reproduction

Corrected track number=track number+2 (correction value)

However, when track number is 9, correction track number is 1, and when track number is 10, correction track number is 2.

At step 202, the corrected track number and the track information of data information 108 of one head switch time before are compared as follows.

(1) In the Case of Positive Direction Reproduction

When corrected track number is 1 or 2, (corrected track number+10)>track information of one frame before Or when corrected track number is 2 to 10, corrected track number>track information of one frame before When this condition is established, the process goes to step 203, and the corrected track number is updated as track information.

If not established, the process goes to step 200 without updating the track information.

(2) In the Case of Negative Direction Reproduction

When corrected track number is 1 to 8, corrected track number<track information of one frame before Or when corrected track number is 9 or 10, corrected track number<(track information of one frame before +10)

When this condition is established, the process goes to step 203, and the corrected track number is updated as track information.

If not established, the process goes to step 200 without updating the track information.

<Generation of Field Information>

Figure 3:
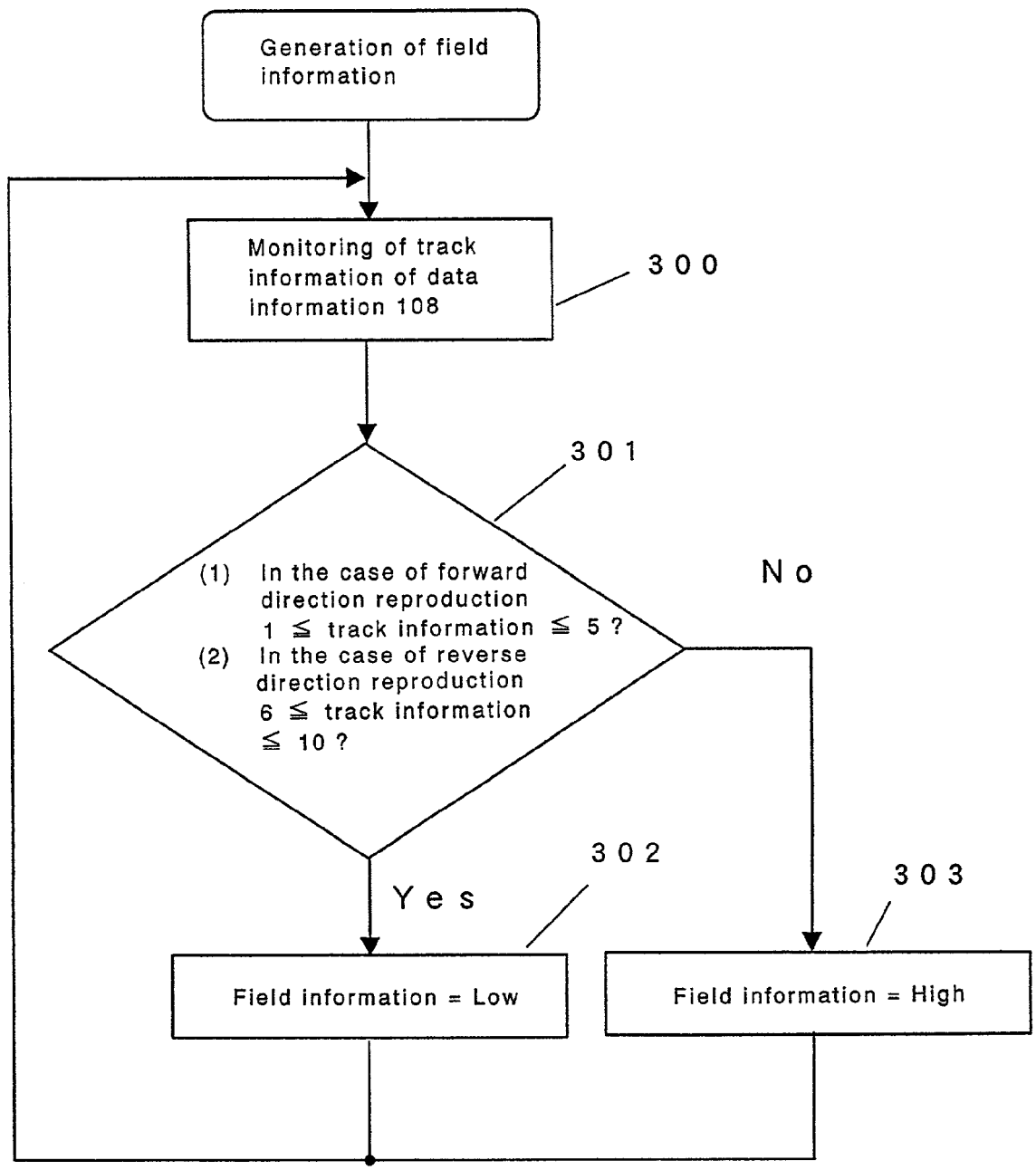
FIG. 3 is a flowchart showing a generation algorithm of field information in embodiment 1.

Field information is generated from the track information according to the algorithm in FIG. 3. When data of one frame is recorded in 10 tracks (track numbers 1 to 10), in positive direction reproduction, in track information from 1 to 5, data in the first half field of one frame is being accumulated. In track information from 6 to 10, data in latter half field is being accumulated. The field information is supposed to be at low level while accumulating data in first half field, and at high level while accumulating data in latter half field.

Referring to FIG. 3, an algorithm of generating field information of data information 108 by the data information generating circuit 106 is explained.

At step 300, track information of data information 108 is monitored.

At step 301, it is judged whether the monitored track information is a value of 1 to 5, or a value of 6 to 10.

(1) In positive direction reproduction, when the track information is 1 to 5, or in negative direction reproduction, when the track information is 6 to 10, the process goes to step 302, and the field information is set to low level.

(2) In positive direction reproduction, when the track information is 6 to 10, or in negative direction reproduction, when the track information is 1 to 5, the process goes to step 303, and the field information is set to high level.

In this algorithm, data of one frame is recorded in 10 tracks, but it can be processed similarly in the case of 12, 20 or other tracks.

<Generation of Frame Information>

Figure 4:
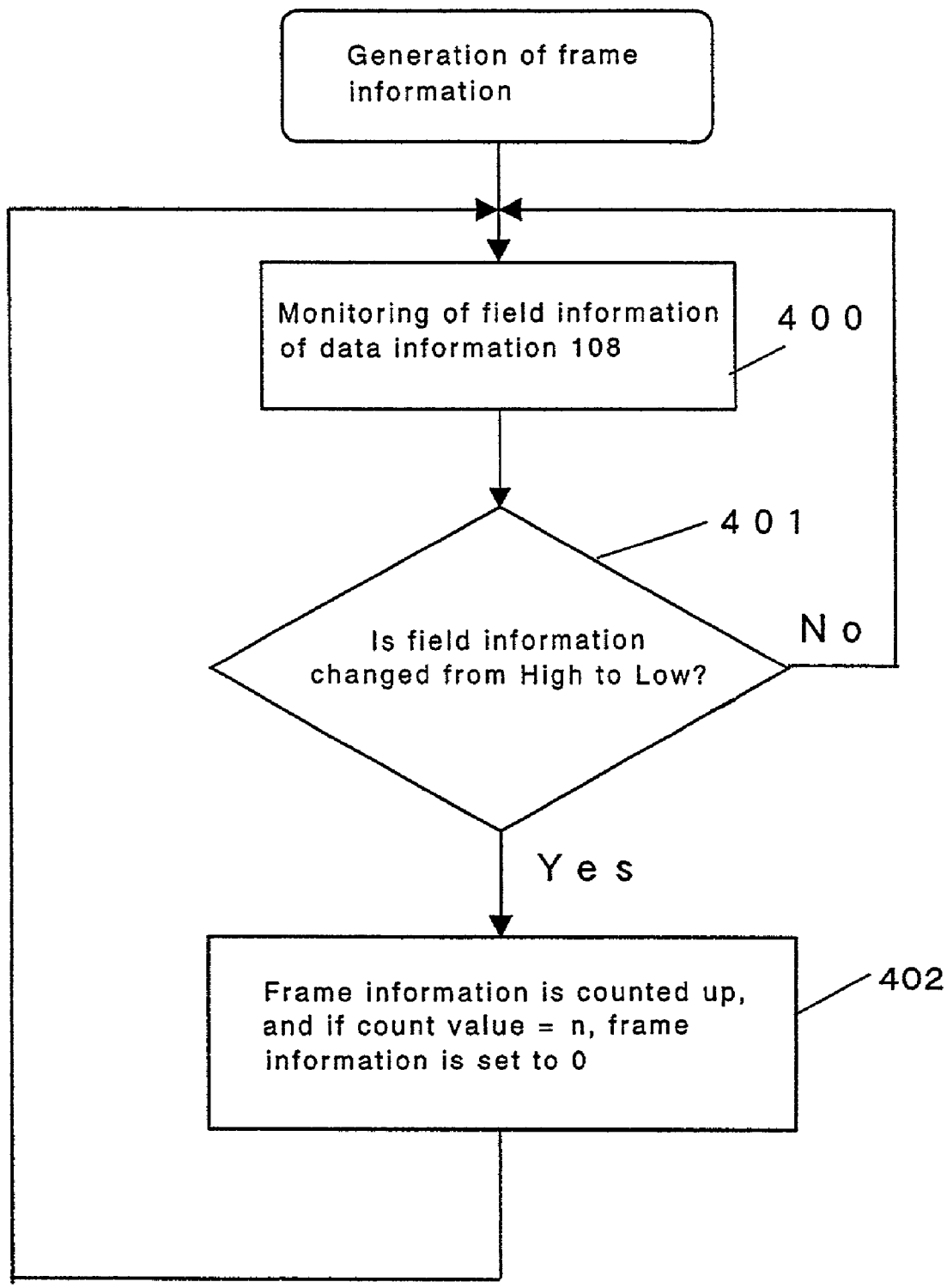
FIG. 4 is a flowchart showing a generation algorithm of frame information in embodiment 1.

Frame information is generated according to an algorithm shown in FIG. 4, by judging whether data of n frames is accumulated or not in the memory 105, from the field information.

Referring to FIG. 4, the algorithm of generating frame information by the data information generating circuit 106 is explained.

At step 400, field information of data information 108 is monitored. It is monitored whether the field information is promoted by one period or not, that is, changed from high to low.

At step 401, when it is judged that the field information is promoted by one period, the frame information is counted up at step 402. When this count value is n, it is reset to 0.

As a result, the frame information shows a value of 0 to n-1.

If it is not judged that the field information is promoted by one period, back to step 400, monitoring of field information is continued.

Figure 5:
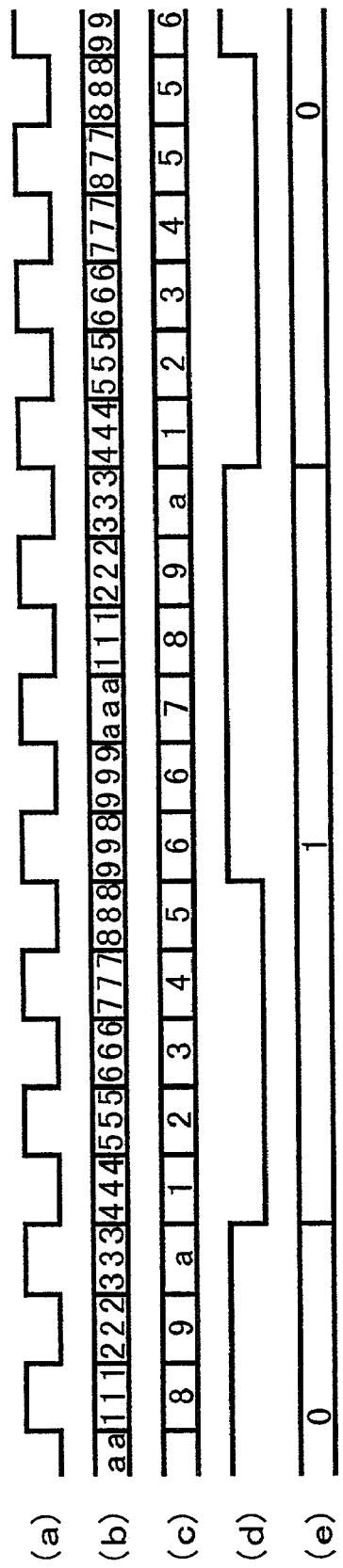
FIG. 5 is a timing chart for generating data information in the case of $\alpha=0.9$ in embodiment 1.

FIG. 5 is a timing chart for generating data information in the case of $\alpha=0.9$ in embodiment 1.

In FIG. 5, (a) is a signal showing head switching time (Tsw), (b) denotes a track number of identification information 102, (c) denotes track information of data information 108, (d) denotes field information of data information 108, and (e) denotes frame information of data information 108.

Alphanumeric symbols in FIG. 5 (b), (c) indicate track numbers, and "a" means that the track number is 10. In FIG. 5 (e), the numeral refers to the value of frame information.

The track number is detected, for example, in every sync block, and it may change from an intermediate point in relation to head scanning to the tracks.

In the case of $\alpha=0.9$, while reproducing data of one frame, at least one track number may be reproduced in different head switch times. In FIG. 5 (b), track numbers 8 and 9 are issued in different head switch times. As a result, the track information, field information, and frame information are changed.

Consequently, the data accumulated in the memory 105 is corrected in the outer correction circuit 107. The data to be corrected is determined by the track information. Later, when outer corrected data are accumulated in the memory 105 for two frames, the memory reading circuit 109 can read out data of two new frames.

Whether data of two frames is accumulated or not is judged on the basis of the change of frame information of data information 108. The data to be read out is changed over in synchronism with a next frame signal when the frame information in data information 108 shows that data for two frames is accumulated. Of the data being read out in two frames, the reproduction time is earlier in data 110, and later in data 111.

Figure 6:
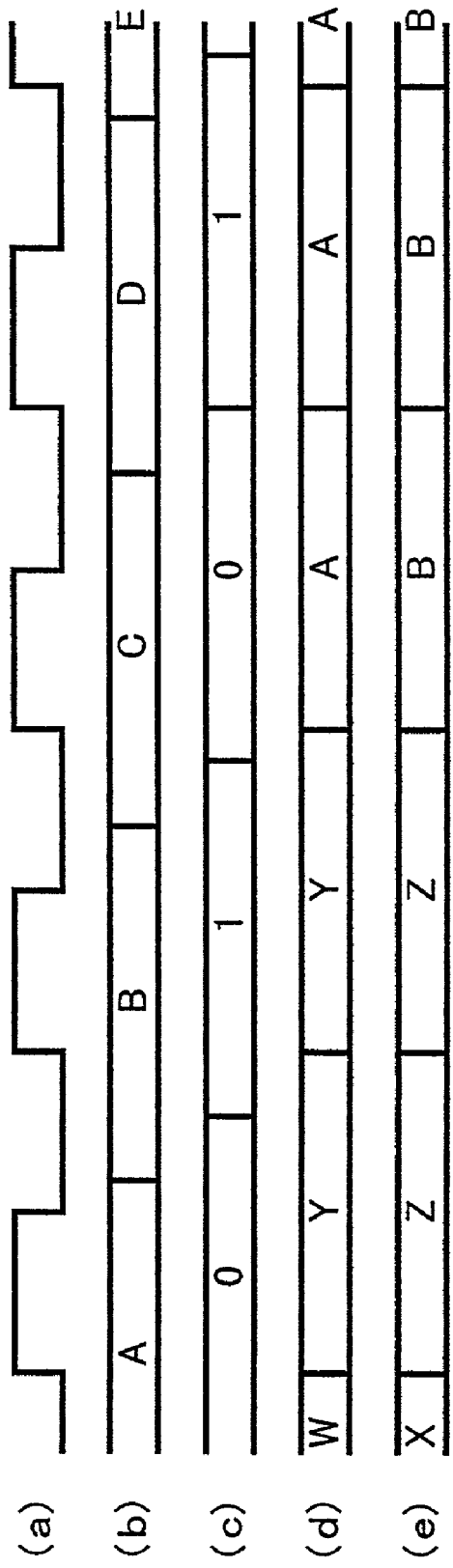
FIG. 6 is a timing chart of data information and frame data being read out by a memory reading circuit in embodiment 1.

FIG. 6 is a timing chart of data information and frame data being read out by the memory reading circuit in embodiment 1.

In FIG. 6, (a) is a reproduction reference frame signal, (b) is reproduced data 100 to be entered in the sync block detecting circuit 102, (c) is frame information of data information 108, (d) is frame data 110 being read out by the memory reading circuit 109, and (e) is frame data 111 being read out by the memory reading circuit 109.

Alphabetic letters in FIG. 6 (b), (d), (e) are symbols attached to frames, and the alphabetic order is the sequence being recorded in the VCR.

The data of two frames 110, 110 thus being read out are restructured into main data and sub data on the basis of the field information and frame information of the data information 108 in a transmitting circuit 112. The main data is sent out to a transmission output terminal 113, and sub data is sent out to a terminal 114, and transmitted. The transmitting circuit 112 restructures, if only main data is transmitted, so that much of frame data in the data reproduced at $\alpha$-times may be transmitted.

When $\alpha$ is less than 1.0, it is restructured so that frame data 110 or 111 may be transmitted as main data. Data is restructured, in one frame period of reproduction reference frame signal, on the basis of two-bit value composed of field information of the data information 108 as LSB and frame information as MSB, and its change.

When the two-bit value changes as follows, the frame data 110 is issued as both main and sub data. At this time, the sub data is same as the main data, and is hence provided with a flag showing invalid data.

(1) When not changed as 0 or 1.
(2) When changed from 3 to 0.
(3) When changed from 0 to 1.
(4) When changed from 2 to 3, and to 0.
(5) When changed from 3 to 0, and to 1.

Or when changed follows, the frame data 111 is issued as both main and sub data. At this time, the sub data is same as the main data, and is hence provided with a flag showing invalid data.

(6) When not changed as 2 or 3.
(7) When changed from 1 to 2.
(8) When changed from 2 to 3.
(9) When changed from 0 to 1, and to 2.
(10) When changed from 1 to 2, and to 3

Figure 7:
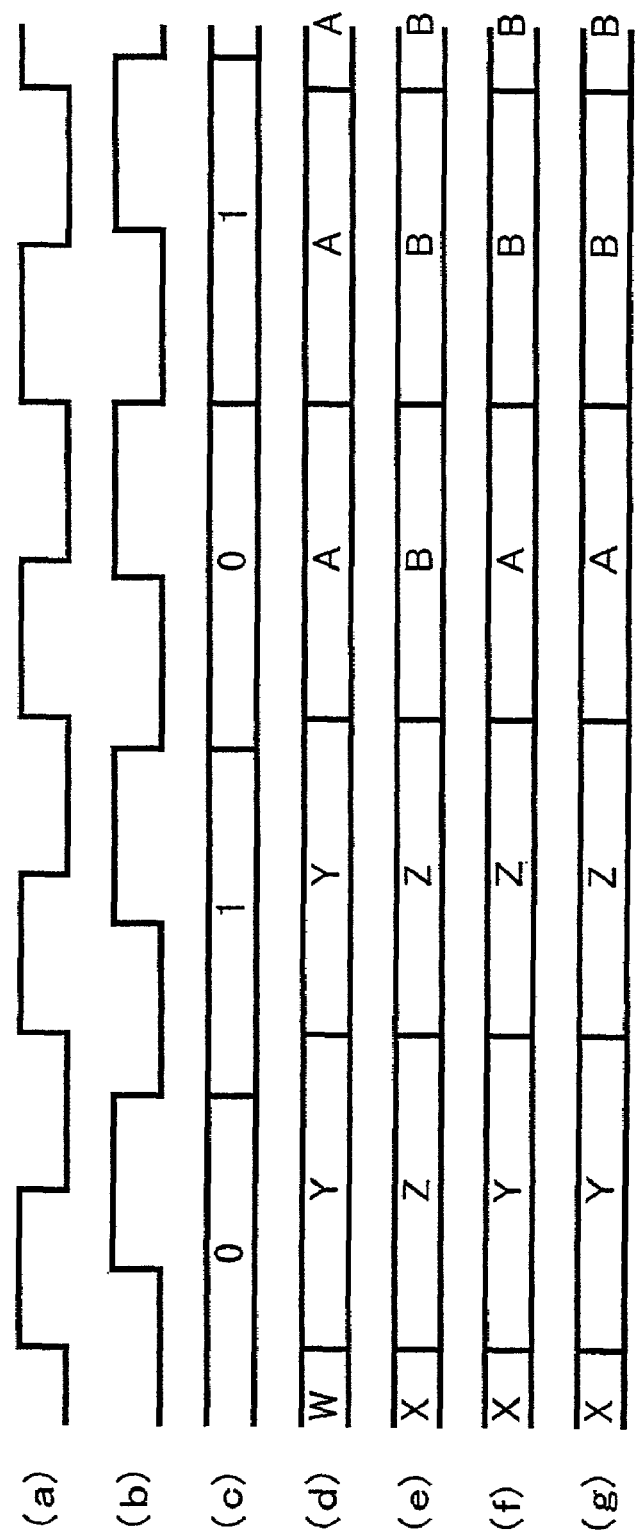
FIG. 7 is a timing chart for restructuring data in the case of $\alpha=0.9$ in embodiment 1.

FIG. 7 is a timing chart showing data restructuring in the case of $\alpha=0.9$ in embodiment 1.

In FIG. 7, (a) is a reproduction reference frame signal, (b) is field information of data information, (c) is frame information of data information, (d) is frame data 110, (e) is frame data 111, (f) is output data from a main data output terminal 113, and (g) is output data from a sub data output terminal 114.

Figure 8:
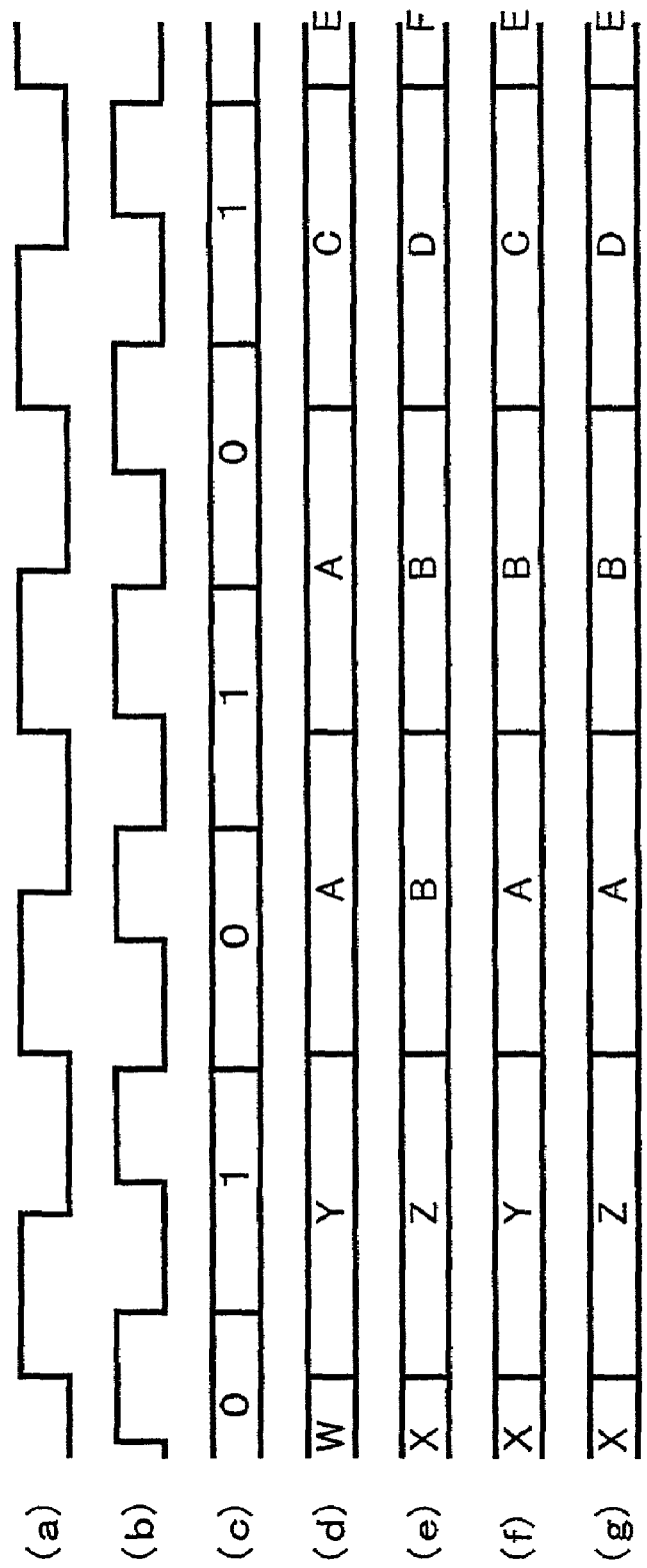
FIG. 8 is a timing chart for restructuring data in the case of $\alpha=1.5$ in embodiment 1.

In addition to data structuring when $\alpha=0.9$, FIG. 8 shows a timing chart showing data restructuring in the case of $\alpha=1.5$ in embodiment 1. When $\alpha$ is larger than 1.0, aside from the case of $\alpha \leq 1.0$ mentioned above, the two-bit value changes as follows.

(11) When changed sequentially from 0 to 1, 2, and 3, the frame data 111 is issued as both main data and sub data.

In this case, too, the sub data is same as the main data, and is hence provided with a flag showing invalid data.

(12) When changed sequentially from 1 to 2, 3, and 0, the frame data 110 is issued as both main data and sub data.

In this case, too, the sub data is same as the main data, and is hence provided with a flag showing invalid data.

(13) When changed sequentially from 2 to 3, 0, and 1; or
(14) When changed sequentially from 3 to 0, 1, and 2

The frame data 110 is issued to the main data transmission terminal 113, and the frame data 111 to the sub data transmission terminal 114. Herein, the main data and sub data are different, and are both provided with a flag showing valid data.

In this manner, all of the data reproduced at an ordinary speed a within ±2 times can be transmitted without changing the transmission rate. Or by transmitting the main data only, much of reproduced data can be transmitted.

That is, from the state of change of field information (one bit) and frame information (n types, for example, one bit if n=2), the data accumulation status can be judged, and the accumulation can be predicted. In synchronism with the reproduction reference frame signal, the frame data to be issued (that can be issued) is judged. Hence, data can be restructured so as to transmit all data at a-times speed.

In embodiment 1, the case of n=2 is explained, but if n=4, 8 or other integer larger than 2, the transmission data can be restructured by extending the same concept.

Embodiment 2

Figure 9:
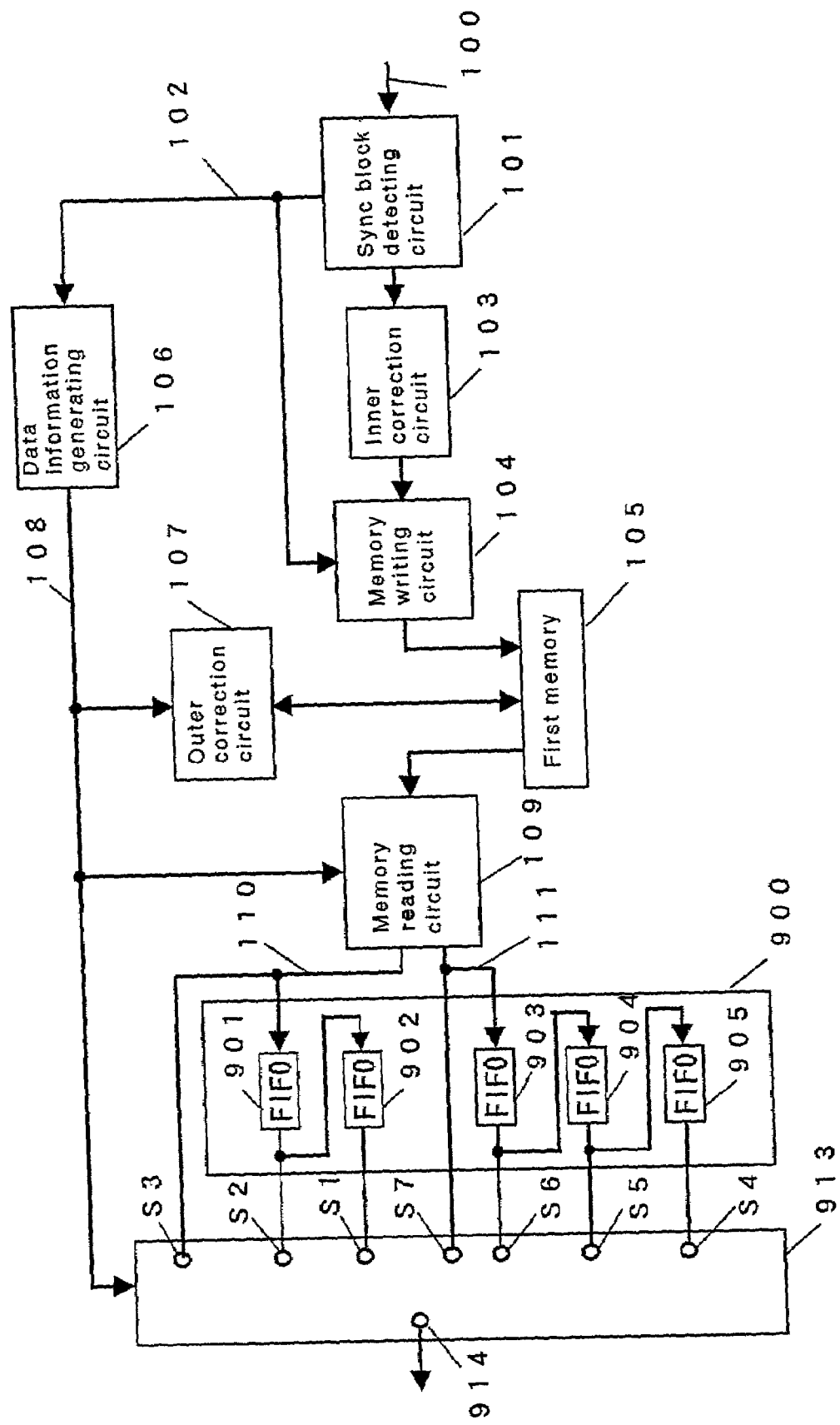
FIG. 9 is a block diagram showing a configuration of a reproduced signal processing apparatus in embodiment 2 of the invention.

FIG. 9 is a block diagram showing a configuration of a reproduced signal processing apparatus in embodiment 2 of the invention. In this embodiment, n is 2, and the same reference numerals as in FIG. 1 are not explained herein.

The reproduction operation of the reproduced signal processing apparatus of the embodiment is explained. It is same as in embodiment 1 from input of reproduced data 100 until the memory reading circuit 109 reads out data of two frames.

Of the data of two frames being read out by the memory reading circuit 109, earlier data 110 and later data 111 of reproduction time being read out are fed into a delay circuit 900.

The delay circuit 900 is composed of FIFO 901, 902, 903, 904, and 905 for delaying data by one frame. The data 110 is fed into the FIFO 901, and the output of the FIFO 901 is fed into the FIFO 902. The data 111 is fed into the FIFO 903, and its output is fed into the FIFO 904. The output of the FIFO 904 is fed into the FIFO 905.

A reproduction output control circuit 913 has input terminals S1, S2, S3, S4, S5, S6, and S7. The data 110 issued from the memory reading circuit is fed into the terminal S3. The output data from the FIFO 901 and FIFO 902 are fed into the terminals S2 and S1, respectively. The data 111 issued from the memory reading circuit is fed into the terminal S7. The output data from the FIFO 903, FIFO 904, and FIFO 905 are fed into the terminals S6, S5, and S4, respectively.

The reproduction output control circuit 913 selects the data entered in the terminals S1 to S7 by using the field information and frame information of the data information 108, and issues to an output terminal 914.

The reproduction output control circuit 913 selects the data to be issued on the basis of data information (DIm-1) in the closest reproduction reference frame period (Tm-1) and data information (DIm-2) in frame period (Tm-2) of one frame earlier. More specifically, on the basis of the two-bit value composed of field information of data information as LSB and frame information as MSB, the data to be issued is selected according to (1) the initial two-bit value (initial value) in the reproduction reference frame period, and (2) the number of times of changes of two-bit value in this period or in the first half and second half of the period.

Figure 10:
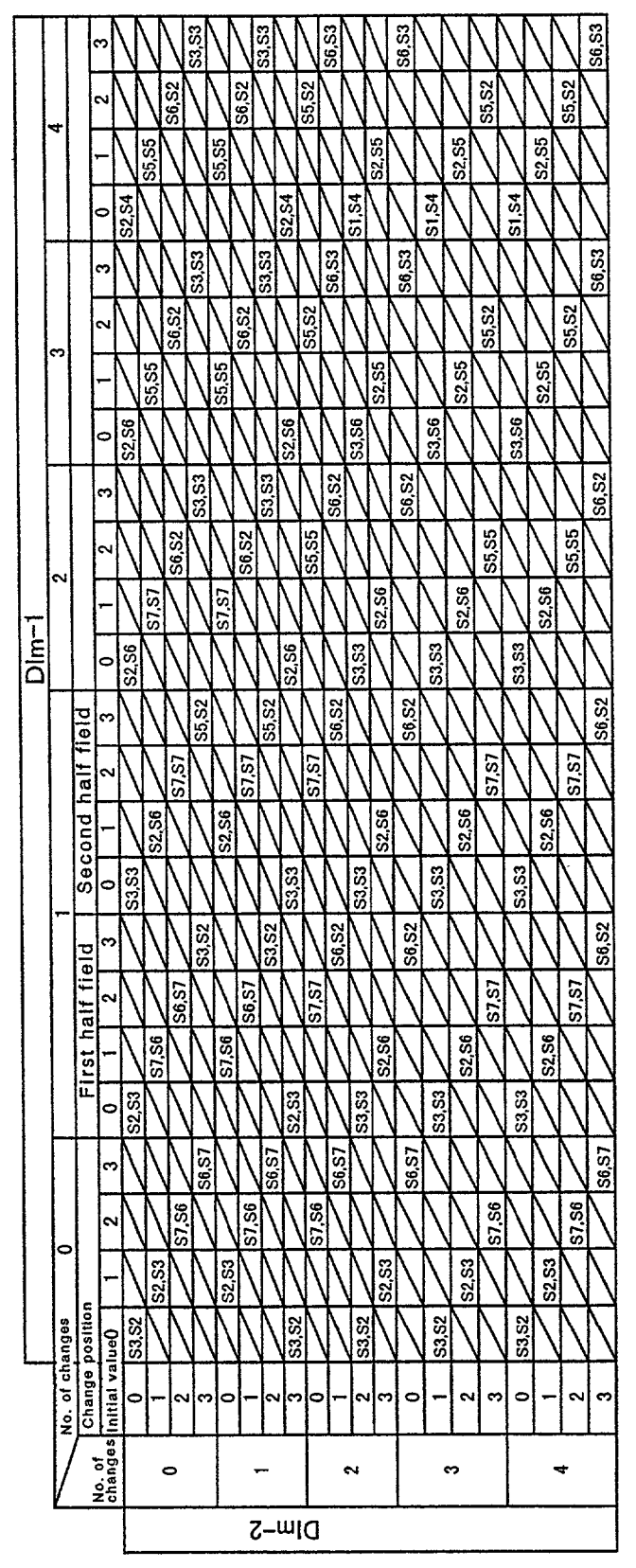

That is, the data is selected as shown in FIG. 10. For example, (1) if the number of times of changes of two-bit value in Tm-1 is 1, the change position is in the first half field, and the initial value is 0, and (2) if the number of times of change in Tm-2 is 0 and the initial value is 0, the data fed in the terminal S1 is selected in the first half field, and the data fed in the terminal S3 in the second half.

Figure 11:
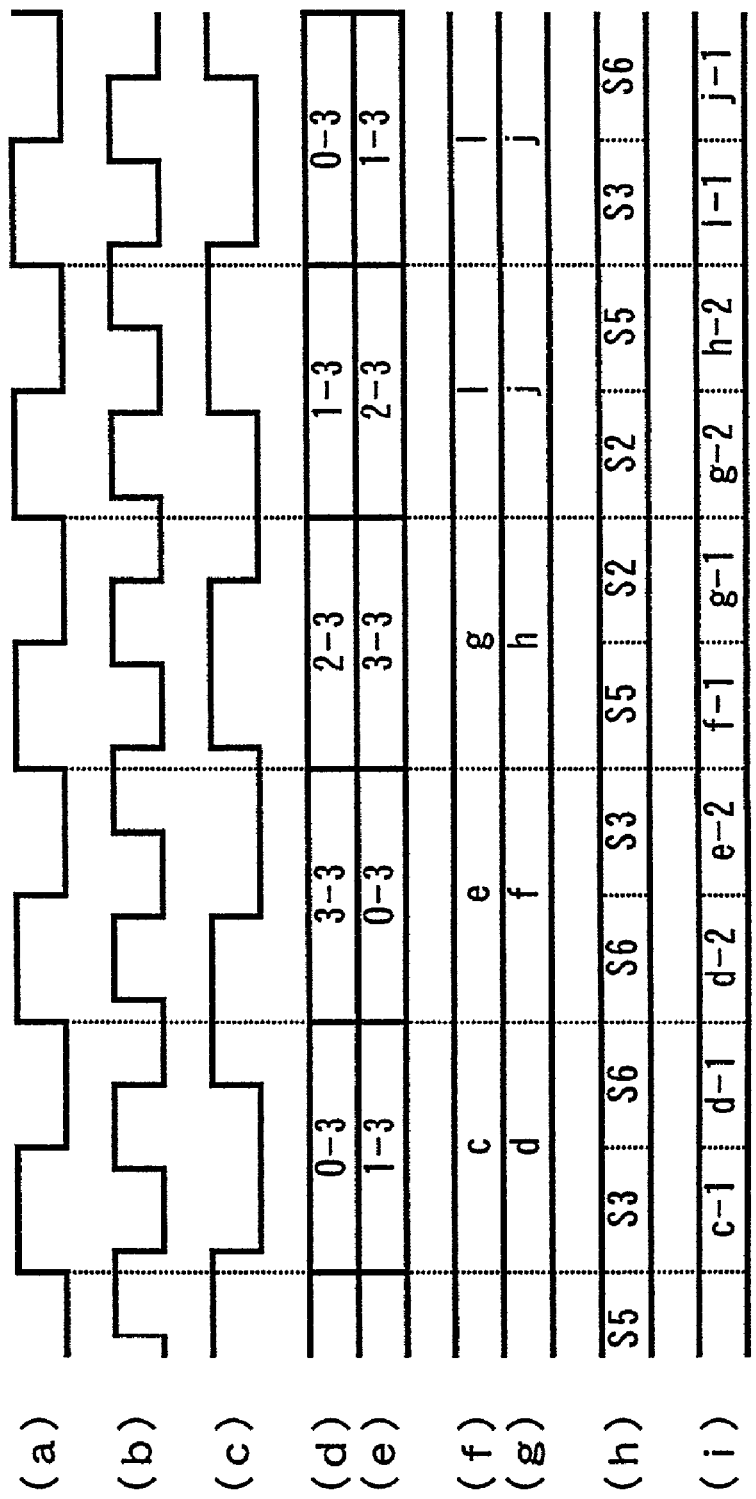
FIG. 11 is a timing chart of field regeneration in embodiment 2.

For example, the timing chart when reproduced at α=1.5 according to FIG. 10 is shown in FIG. 11. FIG. 11 is a timing chart of field reproduction in embodiment 2.

In FIG. 11, (a) is a reproduction reference frame signal, (b) is field information of data information 108, (c) is frame information of data information 108, (d) is result of change of data information 108 in the closest frame period (Tm-1), (e) is result of change of data information 108 in the period (Tm-2) of one frame earlier, (f) is frame data 110, and (g) is frame data 111. Further, (h) denotes an input terminal of the reproduction output control circuit 913 for selecting according to FIG. 10 on the basis of (d) and (e), and (i) is video data issued from a video output terminal 914.

In FIG. 11 (d) and (e), for example, "0–3" indicates that the state of field information and frame information of data information starts from 0 (initial value) at the beginning of one frame, and shows the number of times of change in one frame is 3. Further, in (i), for example, "c-1" indicates the first field (first half of the field) of frame data c, and if "1" is replaced by "2", it means the second field (second half of the field).

In this way, by restructuring the data reproduced at an arbitrary speed α within +2 times, field slow reproduction and field double speed reproduction of smooth motion are realized.

In embodiment 2, the case of n=2 is explained, but if n=4, 8 or other integer larger than 2, smooth field reproduction is possible by extending the same concept. Or the field output may be also selected in a different manner from the case of FIG. 10.

Embodiment 3

Figure 12:
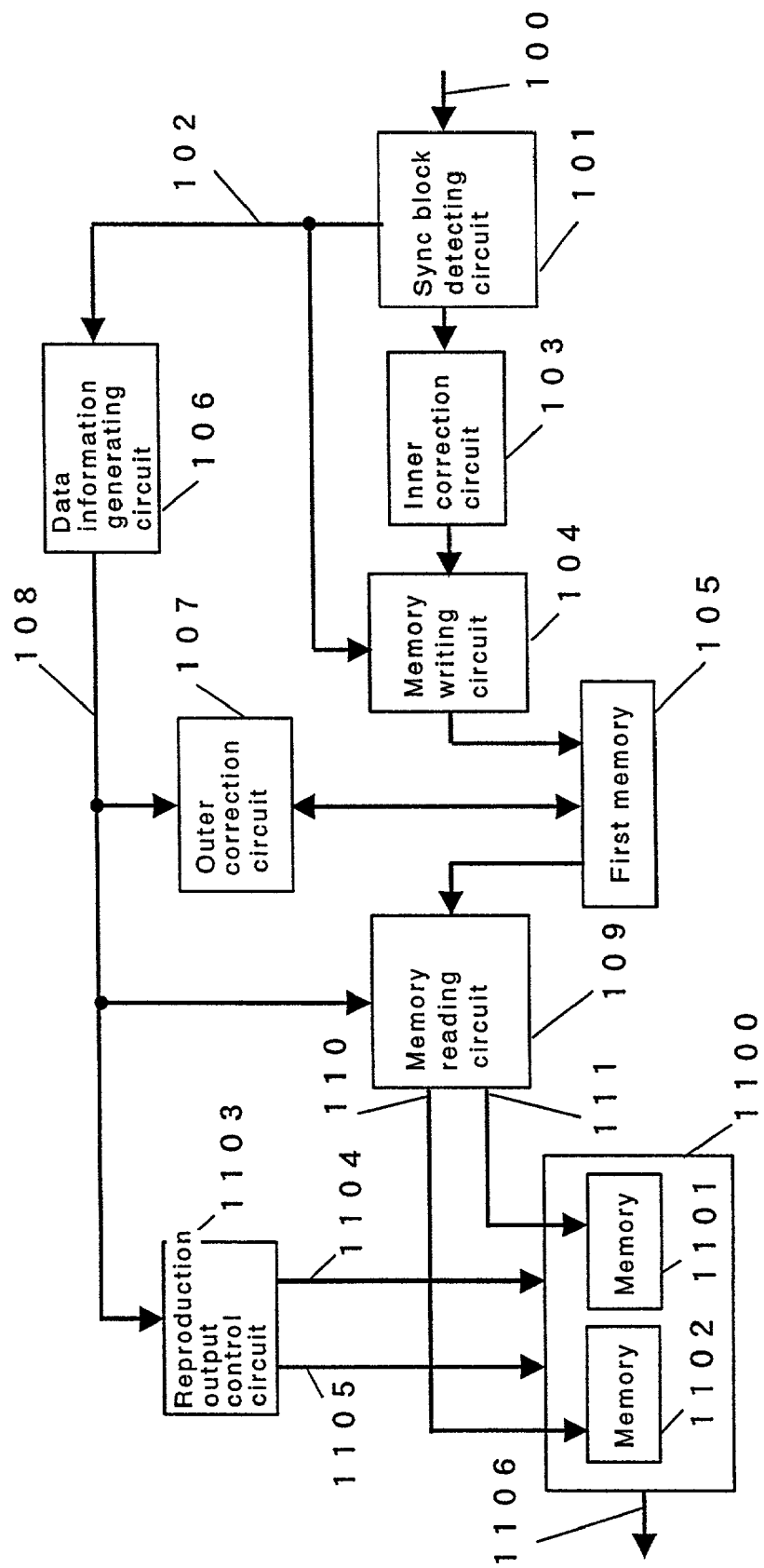
FIG. 12 is a block diagram showing a configuration of a reproduced signal processing apparatus in embodiment 3 of the invention.

FIG. 12 is a block diagram showing a configuration of a reproduced signal processing apparatus in embodiment 3 of the invention. In this embodiment, n is 2, and the same reference numerals as in FIG. 1 are not explained herein.

The reproduction operation of the reproduced signal processing apparatus of the embodiment is explained. It is same as in embodiment 1 from input of reproduced data 100 until the memory reading circuit 109 reads out data of two frames.

Of the data of two frames being read out by the memory reading circuit 109, data 110 being read out earlier in reproduction time is written into a memory 1101, and data 111 being read out later is written into a memory 1102. The memories 1101 and 1102 compose a second memory 1100. The memories 1101 and 1102 have a capacity of storing data of at least three frames. They are mapped so as to be written into an independent region in each frame. Writing into the memories 1101, 1102 is controlled by an upper bit address signal 1104 in each frame of reproduction reference frame in the region of the memory map, and the entered frame data is delayed by two frames. For example, when the memories 1101, 1102 have a capacity of storing data of three frames, they are mapped so that the upper two bits of the memory address may indicate three regions of the memory.

A reproduction output control circuit 1103 controls to issue data from which field by using the field information and frame information of data information 108, and reads out data from the memory 1100, and issues to a video output terminal 1106 in the field unit.

The reproduction output control circuit 1103, same as the control circuit 913 explained in embodiment 2, controls data reading from the memory 1100 on the basis of the data information. That is, the reproduction output control circuit 1103 selects the data to be issued on the basis of data information (DIm-2) in frame period (Tm-2) of one frame earlier than the closest reproduction reference frame period (Tm-1) and data information (DIm-3) in frame period (Tm-3) of one more frame earlier.

More specifically, on the basis of the two-bit value composed of field information of data information as LSB and frame information as MSB, data reading from the memory 1100 is controlled according to (1) the initial two-bit value (initial value) in the reproduction reference frame period, and (2) the number of times of changes of two-bit value in this period or in the first half and second half of the period. The reason of using the data information of one frame earlier and two frames earlier is that it takes one frame time to write data into the memory 1100. Specific control of data reading from the memory 1100 is conducted as shown in FIG. 13.

Figure 13:
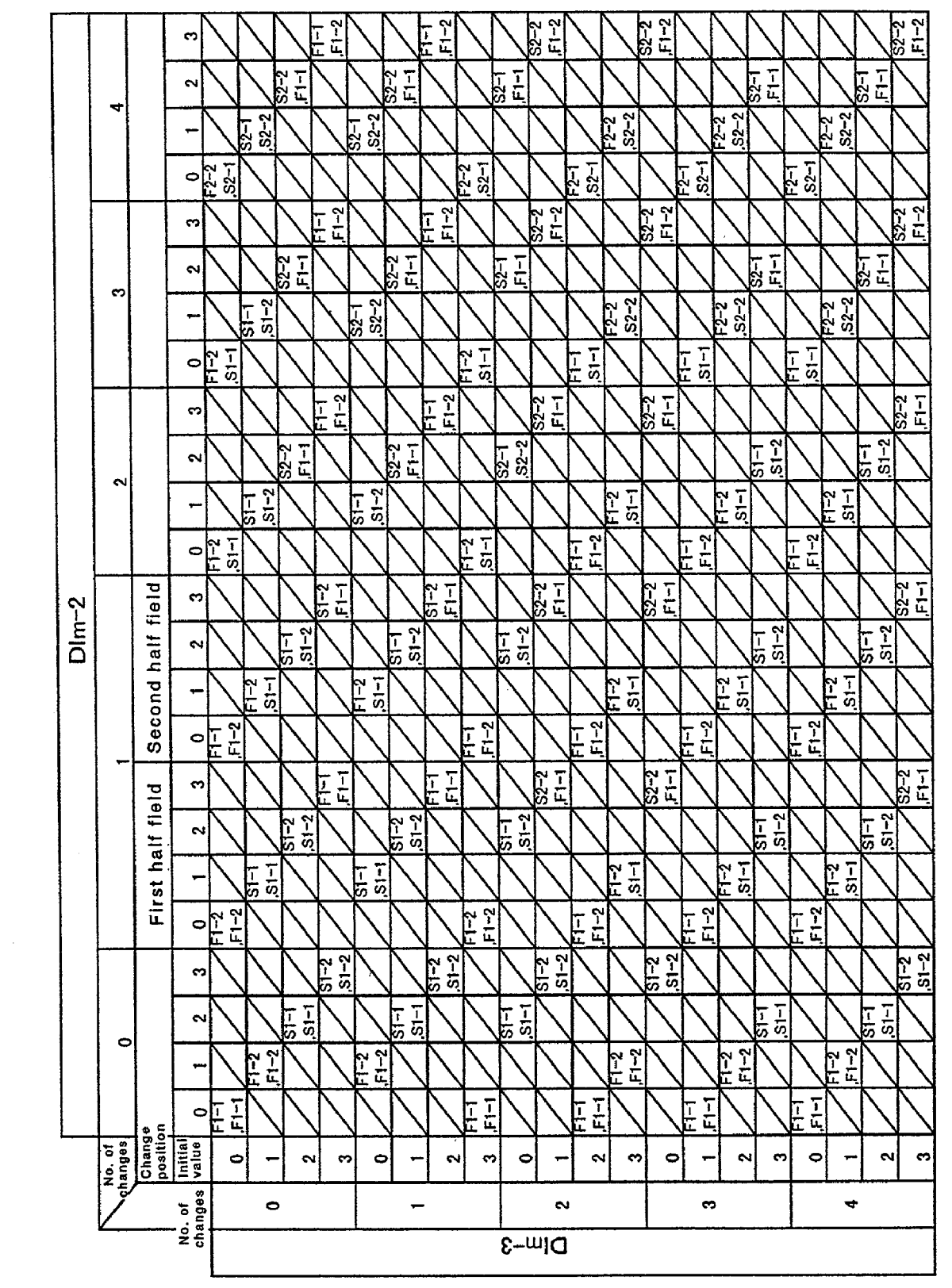

For example, in "F1-1, S2-1" in FIG. 13, "F1-1" indicates the field data to be read out from the memory 1100 in the first half field time of the reproduction reference frame, and "S2-1" denotes the field data to be read out in the second half field time. Further, "F" shows the output from the memory 1101, and "S" is the output from the memory 1102. Numerals 1 and 2 following F and S indicate data delayed by one frame and two frames, respectively. Numerals 1 and 2 following the hyphen (−) indicate the first half field and second half field, respectively.

Figure 14:
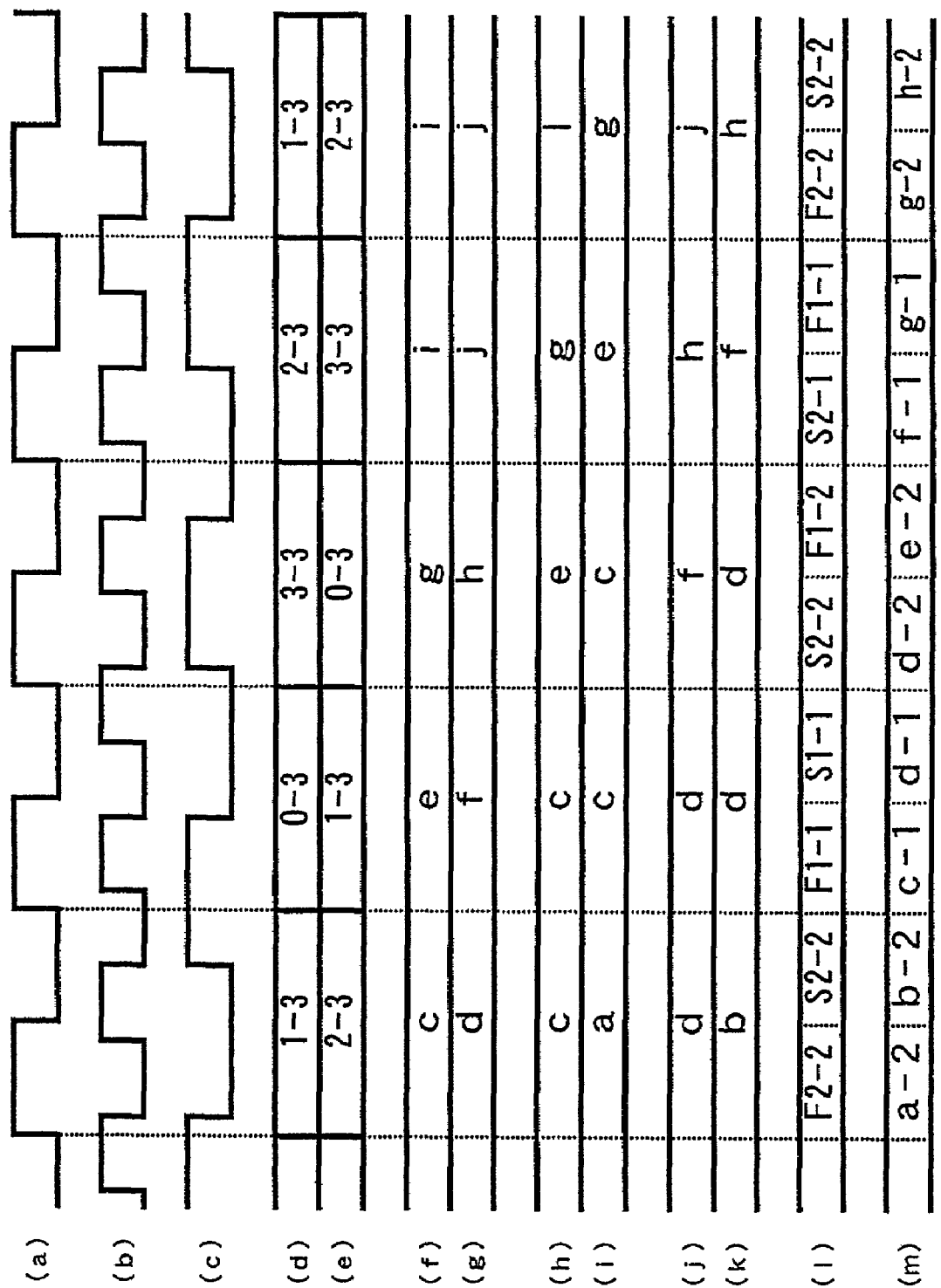
FIG. 14 is a timing chart of field regeneration in the case of $\alpha=1.5$ in embodiment 3.

For example, in embodiment 3 in FIG. 13, the timing chart of field reproduction at α=1.5 is shown in FIG. 14.

In FIG. 14, (a) is a reproduction reference frame signal, (b) is field information of data information 108, (c) is frame information of data information 108, (d) is result of change of data information 108 of one frame earlier, (e) is result of change of data information 108 of two frames earlier, (f) is frame data 110, and (g) is frame data 111, (h) is one-frame delay data of the memory 1101, (i) is two-frame delay data of the memory 1101, (j) is one-frame delay data of the memory 1102, and (k) is two-frame delay data of the memory 1102. Further, (l) is delay data to be read out by the reproduction output control circuit 1103 according to FIG. 13 on the basis of (d) and (e), and (m) is video data issued from a video output terminal 1106.

In FIG. 14 (d) and (e), for example, "1-3" indicates that the number of times of change is 1 and the initial value is 3.

In this way, by restructuring the data reproduced at an arbitrary speed a within ±2 times, field slow reproduction and field double speed reproduction of smooth motion are realized.

In embodiment 3, the case of n=2 is explained, but if n=4, 8 or other integer larger than 2, smooth field reproduction is possible by extending the same concept. Or the manner of reading out from the reproduction output control circuit 1103 is not limited to the method shown in FIG. 13.

Embodiment 4

Figure 15:
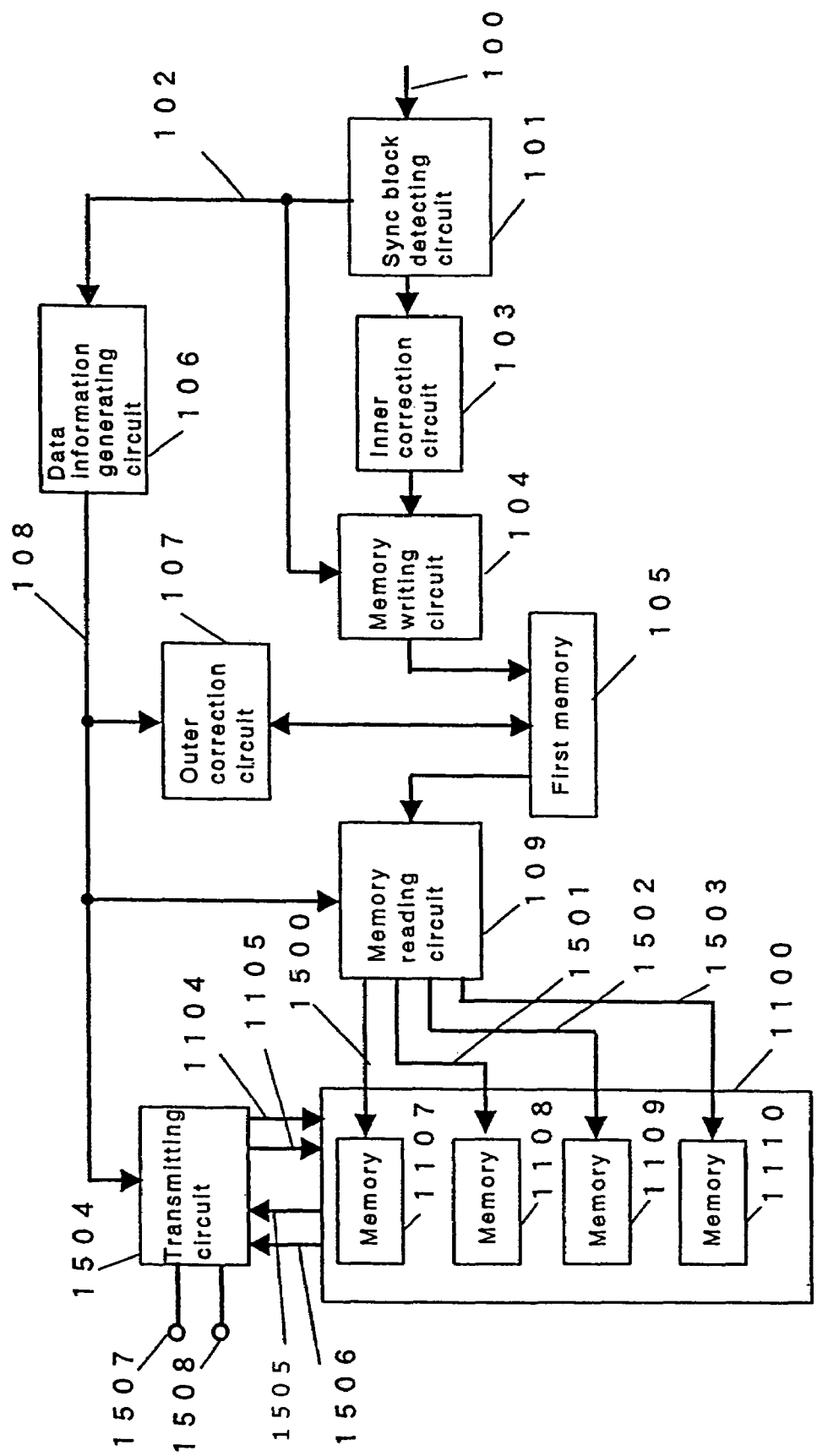
FIG. 15 is a block diagram showing a configuration of a reproduced signal processing apparatus in embodiment 4 of the invention.

FIG. 15 is a block diagram showing a configuration of a reproduced signal processing apparatus in embodiment 4 of the invention. In this embodiment, n is 4, and the same reference numerals as in FIG. 1 and FIG. 12 are not explained herein.

The reproduction operation of the reproduced signal processing apparatus of the embodiment is explained. It is same as in embodiment 3 from input of reproduced data 100 until the memory reading circuit 109 reads out data of four frames, and stores in the memory 1100.

The memory 1100 is composed of four memories 1107, 1108, 1109, and 1110. When data of four frames are accumulated in the memory 105, the memory reading circuit 109 in the embodiment issues the oldest frame data 1500 in reproduction time, second oldest frame data 1501, third oldest frame data 1502, and the latest frame data 1503 in reproduction time.

Four frame data 1500, 1501, 1502, and 1503 being read out from the memory reading circuit 109 are delayed by one frame and two frames in the memories 1107, 1108, 1109, and 1110.

A transmission circuit 1504 reads out one or two frame data from eight pieces of delayed data on the basis of the field information and frame information of the data information 108. In this embodiment, two frame data 1505 and 1506 are read out, and restructured, and transmitted from two transmission output terminals 1507 and 1508.

Restructuring is conducted by extending the concept of embodiment 3, on the basis of change of three bits, using two bits composed of field information of the data information 108 at LSB and frame information at MSB side. In embodiment 3, the field to be reproduced and issued is determined on the basis of the change of the data information 108, whereas the frame data including the field to be issued is read out in this embodiment.

Figure 16:
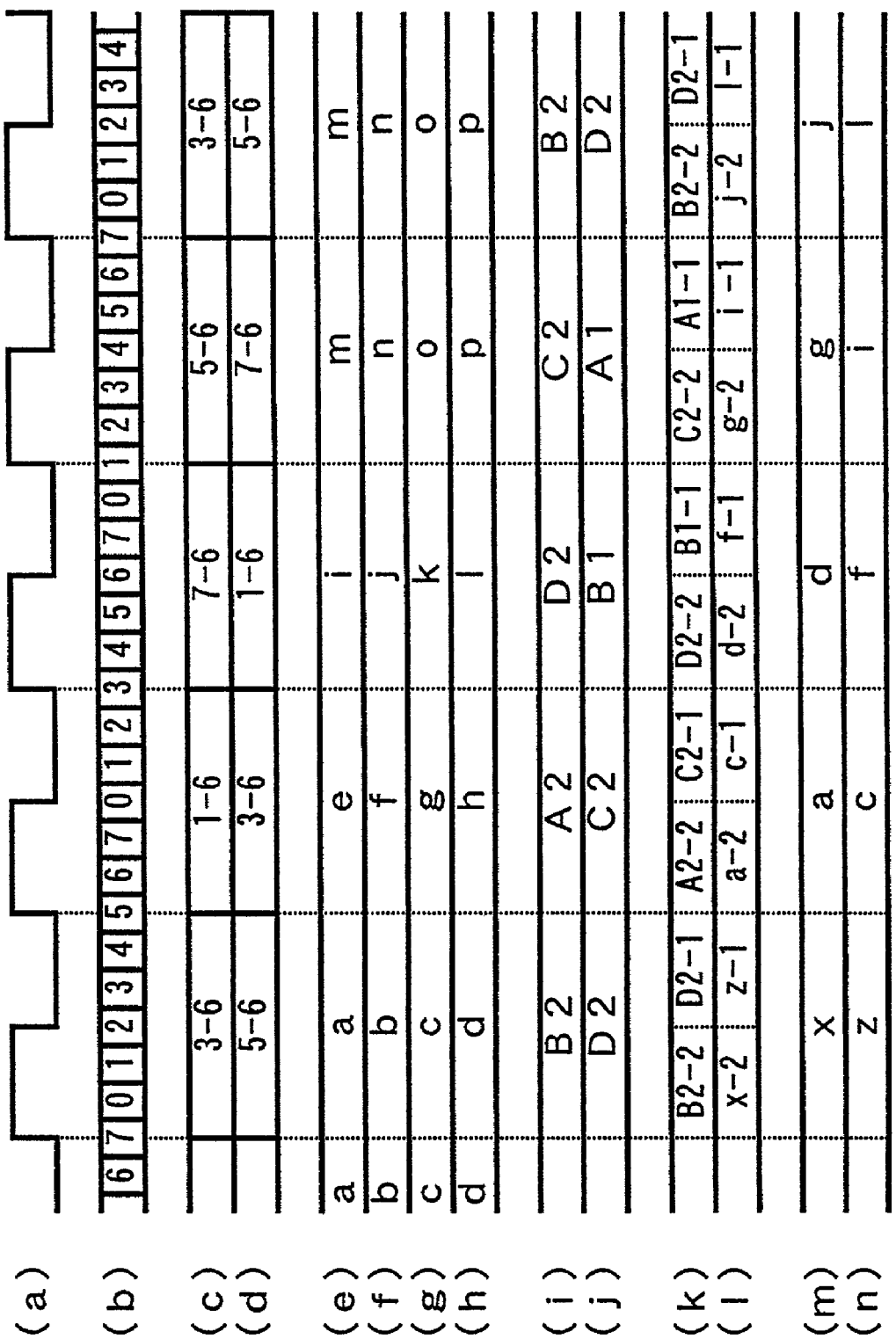
FIG. 16 is a timing chart for restructuring data in the case of $\alpha=3.0$ in embodiment 4.

FIG. 16 shows a timing chart of restructuring by the transmitting circuit 1504 at α=3.

In FIG. 16, (a) is a reproduction reference frame signal, (b) is three-bit data information (frame information: 2 bits, field information: 1 bit), (c) is result of observation of change of data information 108 of one frame earlier (Tm-1), (d) is result of observation of change of data information 108 of two frames earlier (Tm-2), (e) is frame data 1500, (f) is frame data 1501, (g) is frame data 1502, and (h) is frame data 1503. Further, (i) and (j) are delayed frame data 1505 and 1506 to be read out from the memory 1100 on the basis of (c) and (d) by the transmission circuit 1504, (k) is field data to be read out from the memory 1100 in the case of field reproduction output, (l) is actual field data in the case of field reproduction output, (m) is output data from a main data transmission output terminal 1507, and (n) is output data from a sub data transmission output terminal 1508.

In FIG. 16 (i), (j), (k), A is the data delayed by memory 1107, B by memory 1108, C by memory 1109, and D by memory 1110. For example, "1" of "A1" means data delayed by one frame, or "2" is data delayed by two frames. In (k), "1" following the hyphen (−) indicates the first field (first half field) and "2" is the second field (second half field). In FIG. 16 (c) and (d), "3" of "3-6" means that the state of field information and frame information of data information starts from 3 (initial value) at the beginning of one frame, and "6" means it is changed six times in one frame (number of changes).

In this way, by restructuring the data reproduced at an arbitrary speed a within ±4 times into data of two frames and transmitting, the transmission rate is small, and field slow reproduction and field double speed reproduction of smooth motion at the reception side are realized. Or if other than n=4, by restructuring into data of two frames and transmitting, similarly, field slow reproduction and field double speed reproduction of smooth motion at the reception side are realized.

INDUSTRIAL APPLICABILITY

According to the reproduced signal processing apparatus of the invention, by restructuring the data reproduced at an arbitrary speed a within ±n times depending on the accumulation status (reproduction status) in the memory, all reproduced data can be transmitted. Further, by adequately changing over and controlling the reproduced data at an arbitrary speed a within ±n times depending on the accumulation status (reproduction status), field slow reproduction and field double speed reproduction of smooth motion are realized. Moreover, by restructuring the data reproduced at an arbitrary speed a within ±n times depending on the accumulation status (reproduction status), without transmitting all the reproduced data, field slow reproduction and field double speed reproduction of smooth motion at the reception side are realized.

What is claimed is:

1. A reproduced signal processing apparatus for processing reproduced data recorded in sync blocks reproduced at an arbitrary speed of ±α times a reproducing speed, comprising:
   sync block detecting means for detecting identification information associated with the reproduced data,
   data information generating means for generating data information comprising track information, field information and frame information from the identification information,
   first memory means for storing plural frames of the reproduced data,
   memory writing means for writing reproduced data in said first memory means on the basis of the identification information,
   memory reading means for reading out data of n frames in parallel (n being an integer of 2 or more satisfying the relation of α≦n) accumulated in said first memory means, and
   transmitting means for transmitting n frames of transmission data in parallel by restructuring the data of n frames into a main data output and a sub data output on the basis of said data information.

2. The reproduced signal processing apparatus of claim 1, wherein the main data output of said transmitting means either transmits n frames of the data read out by said memory reading means to said main data, or transmits n frames of transmission data to said main data restructured by selecting m frames out of n frames (m being an integer satisfying the relation of m<n), according to the data information.

3. The reproduced signal processing apparatus of claim 2, wherein said transmitting means transmits one of n frames of transmission data as said main data and a remainder as said sub data, and restructures the transmission data so as to transmit all frames of data reproduced at α times by transmitting all of said main data and said sub data,
   whereby a substantial number of frames of data reproduced at α times is transmitted as said main data.

4. The reproduced signal processing apparatus of claim 2, wherein said transmitting means transmits information showing whether n frames of data to be transmitted are valid or invalid, by adding said information to the transmission data.

5. The reproduced signal processing apparatus of claim 1, wherein said transmitting means further comprises second memory means for accumulating the data of n frames read out in parallel by said memory reading means, each data of said n frames are delayed by one frame and two frames by said second memory means, and
   m frames (m being 1 or 2) of data are read out from the second memory means on the basis of the data information, by controlling said second memory means, and are restructured into two parallel outputs of transmission data.

6. The reproduced signal processing apparatus of claim 5, wherein said transmitting means restructures the data delayed by one frame and two frames so as to obtain a reproduction output of α times at a reception side.

7. The reproduced signal processing apparatus of claim 5, wherein said transmitting means transmits information showing whether two parallel outputs of data to be transmitted are valid or invalid, by adding said information to the data.

8. The reproduced signal processing apparatus of claim 3, wherein said transmitting means transmits information showing whether n frames of data to be transmitted are valid or invalid, by adding said information to the transmission data.

9. The reproduced signal processing apparatus of claim 6, wherein said transmitting means transmits information showing whether two frames of data to be transmitted are valid or invalid, by adding said information to the data.

10. A reproduced signal processing apparatus for processing reproduced data recorded in sync blocks reproduced at an arbitrary speed of ±α times of a reproducing speed, comprising:
    sync block detecting means for detecting identification information associated with the reproduced data,
    data information generating means for generating data information comprising track information, field information and frame information from the identification information,
    first memory means for storing plural frames of the reproduced data,
    memory writing means for writing the reproduced data in said first memory means on the basis of the identification information,
    memory reading means for reading out the data of n frames in parallel (n being an integer of 2 or more satisfying the relation of α≦n) accumulated in said first memory means,
    delay means for issuing n frames of data read out by said memory reading means by delaying one parallel output of said memory reading means by each of one field and two fields, and delaying a second parallel output by each of one field, two fields and three fields, and
    reproduction output control means for selecting and issuing outputs of said delay means and memory reading means in field units on the basis of the data information.

11. A reproduced signal processing apparatus for processing reproduced data recorded in sync blocks reproduced at an arbitrary speed of ±α times of a reproducing speed, comprising:
    sync block detecting means for detecting identification information associated with the reproduced data,
    data information generating means for generating data information comprising track information, field information and frame information from the identification information,
    first memory means for storing plural frames of the reproduced data,
    memory writing means for writing the reproduced data in said first memory means on the basis of the identification information,
    memory reading means for reading out the data of n frames in parallel (n being an integer of 2 or more satisfying the relation of α≦n) accumulated in said first memory means,
    second memory means for accumulating the data of n frames read out by said memory reading means for the portion of three frames, and
    reproduction output control means for selecting and issuing field data on the basis of the data information, from the data delayed by one frame and two frames by controlling said second memory means.

* * * * *

UNITED STATES PATENT AND TRADEMARK OFFICE
CERTIFICATE OF CORRECTION

PATENT NO. : 6,990,286 B1
APPLICATION NO. : 09/786524
DATED : January 24, 2006
INVENTOR(S) : Masatoshi Taniguchi et al.

It is certified that error appears in the above-identified patent and that said Letters Patent is hereby corrected as shown below:

Cover Page

At item (75) Inventors, "Hirofuni" should read -- Hirofumi --.

Signed and Sealed this

Twenty-ninth Day of August, 2006

JON W. DUDAS
*Director of the United States Patent and Trademark Office*